United States Patent
Boulay et al.

(10) Patent No.: US 7,342,928 B2
(45) Date of Patent: Mar. 11, 2008

(54) METHOD AND SYSTEM FOR ACCESSING A PEER-TO-PEER NETWORK

(75) Inventors: Jean-Christophe Boulay, Verson (FR); Stephane Petit, Herouville Saint Clair (FR); Philippe Magliulo, Caen (FR)

(73) Assignee: France Telecom (FR)

( * ) Notice: Subject to any disclaimer, the term of this patent is extended or adjusted under 35 U.S.C. 154(b) by 691 days.

(21) Appl. No.: 10/835,781

(22) Filed: Apr. 30, 2004

(65) Prior Publication Data

US 2004/0264471 A1 Dec. 30, 2004

(30) Foreign Application Priority Data

Apr. 30, 2003 (FR) .................................. 03 05378

(51) Int. Cl.
*H04L 12/56* (2006.01)
*G06F 15/16* (2006.01)
*G06F 15/173* (2006.01)

(52) U.S. Cl. ..................... 370/395.2; 709/203; 709/227
(58) Field of Classification Search ............. 370/395.2; 709/203
See application file for complete search history.

(56) References Cited

U.S. PATENT DOCUMENTS

2003/0009587 A1* 1/2003 Harrow et al. .............. 709/238
2003/0125063 A1* 7/2003 Svensson et al. ........... 455/517

OTHER PUBLICATIONS

Tzvetan Horozov et al., "MOBY—A Mobile Peer-to-Peer Service and Data Network", Proceedings of the International Conference on Parallel Processing, Aug. 18, 2002, pp. 1-8.

* cited by examiner

*Primary Examiner*—Jean Gelin
*Assistant Examiner*—Kiet Doan
(74) *Attorney, Agent, or Firm*—Bachman & LaPointe

(57) ABSTRACT

A method comprising a search phase to find shared information in a peer-to-peer network by terminals each being configured as client and as server to share information with other terminals in the peer-to-peer network, the search phase being triggered on a server in a peer-to-peer network, connected to a data transmission network, after a request sent by a user terminal connected to the server but not to the peer-to-peer network, this phase comprising a step in which a list of shared information is created and transmitted to the terminal in response to the request, a step in which shared information is selected from this list on the terminal, and a phase in which the selected information is downloaded to the terminal not connected to the peer-to-peer network, after a download request has been sent from the terminal.

9 Claims, 3 Drawing Sheets

METHOD AND SYSTEM FOR ACCESSING A PEER-TO-PEER NETWORK

BACKGROUND OF THE INVENTION

1. Field of the Invention

This invention relates to networking of terminals based on a "peer-to-peer" architecture, and more particularly a method and system for accessing peer-to-peer networks.

2. Description of Prior Art

It is particularly but not exclusively applicable to downloading of files or sets of files provided by users of such networks.

Peer-to-peer network architectures enable two terminals connected to a transmission network such as the Internet network to communicate with each other directly without passing through a central server that redistributes the data. In this architecture, each terminal is configured so as to act as both server and client. In this manner, each terminal can share its information with an unlimited number of other terminals without needing to use a central server. Therefore, this architecture provides file exchange functions.

Some so-called centralized peer-to-peer networks are used by a server managing a database memorizing a user identifier for each network user, associated with a list of files provided to the other network users. Decentralized peer-to-peer networks also exist in which the database memorizing information about network users is distributed on some user terminals that agree to perform this database function.

At the present time, there are several peer-to-peer networks that are independent of each other such as OpenNap, Gnutella, Kazaa and eDonkey. Each of these networks is used in the Internet network by installing a special access software to the peer-to-peer network on each terminal. The result is that a user cannot access such a network from any terminal. In particular, such an access would be difficult to envisage with a mobile telephone with a limited memory capacity and an operating system that is incompatible with the access software.

Furthermore, due to their enormous success, peer-to-peer networks tend to be saturated, such that when a user of such a network makes a request to download a given file, his request is frequently inserted in a long queue. The user must then often remain connected to the network for several hours before his request can finally be processed. Therefore, this type of downloading cannot be done from a mobile telephone, which firstly does not have a permanent connection to a network (not invoiced by the connection time) and secondly has insufficient memory capacities to receive the downloaded file.

OBJECTS AND SUMMARY OF THE INVENTION

The purpose of this invention is to eliminate these disadvantages. This object is achieved by providing a method for accessing a peer-to-peer network connecting user terminals connected to a data transmission network, each terminal being configured as both client and server to share information with other terminals in the peer-to-peer network, the peer-to-peer network comprising a server connected to the data transmission network and managing a database memorizing information about user terminals in the peer-to-peer network and information shared by these terminals.

According to the invention, this method comprises:
a search phase for finding shared information triggered on the server following a request sent by a user terminal connected to the server but not to the peer-to-peer network, this phase comprising a step of searching in the database for the shared information corresponding to the request, a step in which a list of shared information is transmitted from the server to the terminal in response to the request, and a step in which shared information is selected on the terminal so as to be downloaded, and
a phase in which the shared information is downloaded to the terminal not connected to the peer-to-peer network, after a request for downloading the selected information has been sent from the user terminal.

According to one feature of the invention, the shared information is downloaded directly from the terminal connected to the peer-to-peer network and in which shared information to be downloaded is located, to the user terminal not connected to the peer-to-peer network.

Advantageously, shared information may also be downloaded following a delayed download request, initially from the terminal connected to the peer-to-peer network and in which shared information to be downloaded is located, to the server, and secondly after a delay, from the server to the user terminal not connected to the peer-to-peer network, or another terminal available to the user.

According to another feature of the invention, this method comprises prior to downloading the selected shared information, a step in which the user who made the download request makes a payment for the shared information, and a step in which payment is confirmed at the time that the shared information is downloaded.

The invention also relates to a peer-to-peer network access system connecting user terminals connected to a data transmission network, each terminal being configured as both client and server to share information with other terminals in the peer-to-peer network, the peer-to-peer network comprising a server connected to the data transmission network and managing a database memorizing information about user terminals in the peer-to-peer network and information shared by them.

According to the invention, the server comprises means for receiving from user terminals connected to the server but not to the peer-to-peer network and for processing requests to search for shared information and means for supplying lists of shared information in response, the system comprising means for downloading shared information from a user terminal connected to the peer-to-peer network to a user terminal connected to the server but not to the peer-to-peer network.

According to one specific feature of the invention, this system comprises means for downloading information shared directly from the terminal connected to the peer-to-peer network and in which this information is stored, to the user terminal connected to the data transmission network.

According to another specific, feature of the invention, the server comprises storage means for temporarily storing shared information downloaded from a user terminal connected to the peer-to-peer network following a delayed download request sent by another user terminal.

According to yet another specific feature of the invention, user terminals that might receive shared information in the peer-to-peer network comprise mobile terminals connected to a mobile telephony network, the server comprising means for being connected to the mobile telephone network and means for receiving requests for searches and for downloading the information shared in the peer-to-peer network, from mobile terminals.

Advantageously, the data transmission network is the Internet network.

BRIEF DESCRIPTION OF THE DRAWINGS

A preferred embodiment of the invention will be described as a non-limitative example, with reference to the appended drawings in which.

DETAILED DESCRIPTION OF A PREFERRED EMBODIMENT

Figure 1:
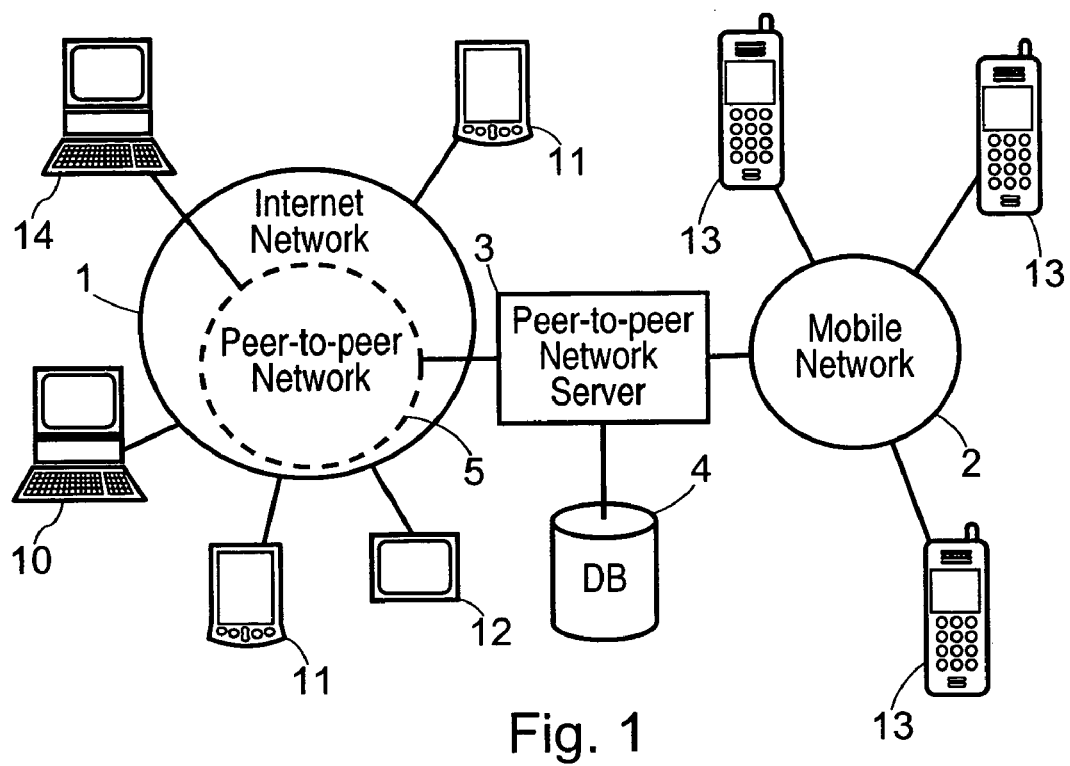
FIG. 1 diagrammatically shows a system in which the method according to the invention is used.

FIG. 1 shows a public data transmission network 1, such as the Internet network, to which user terminals 10, 11, 12, and a peer-to-peer network server 3 designed to manage a peer-to-peer network 5, are connected.

The user terminals may be of different types, for example such as personal computers 10, personal data assistants (PDA) 11, or television sets 12 provided with an access interface to the Internet network.

The server 3 may also be connected to a mobile telephony network 2, directly or through a gateway, to enable users equipped with mobile terminals 13 such as mobile telephones to access the Internet network and the peer-to-peer network 5.

In order to use the peer-to-peer network 5, the server 3 manages a database 4 collecting in particular a user identifier to the peer-to-peer network 5, access information to the terminal 14 of the user connected to the network 1, and the list of files stored in the memory of the terminal 14, that the user would like to provide to other users of the peer-to-peer network, for each user.

Furthermore, conventionally, each user terminal 14 that would like to make files available to other users in the peer-to-peer network 5, must execute a specific access software installed in the terminal memory, this software being designed to configure and connect the terminal to the network, so that it can operate as both client and server towards the peer-to-peer network 5.

According to the invention, the server 3 is also designed to provide access from terminals 10 to 13 to the peer-to-peer network 5, without it being necessary to install the specific access software in the terminals. Consequently, the server 3 is designed to operate as a Web server for users of the Internet network 1, and is configured so that it is seen as client by users of the network 5.

The access thus provided by the server 3 to users of the Internet network 1 who do not have a direct access to the peer-to-peer network 5, is limited to downloading files offered by users of the peer-to-peer network, without it being possible to download files to other terminals in the peer-to-peer network. This access also enables the user to belong to different user groups or communities without providing access to management functions for such a community.

In order to access the download files function, the server 3 provides users not directly connected to the peer-to-peer network with access to the database 4, so that they can make searches on criteria, so as to receive lists of files in response, from which they can select the files to be downloaded.

Figure 2:
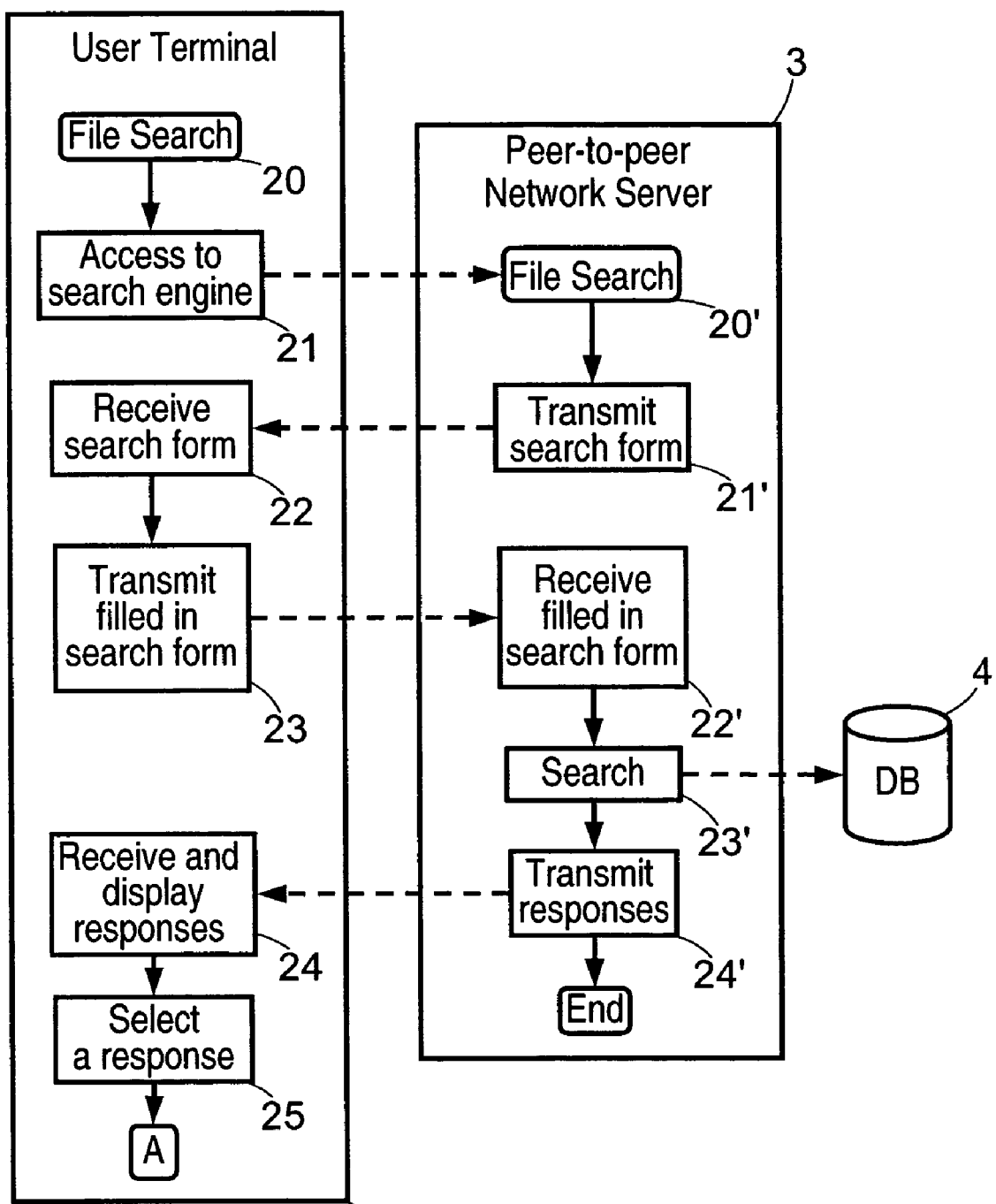

Thus, a user equipped with a terminal 10 to 13 can access the server 3 through the Internet network 1 and/or the mobile network 2, and execute a search procedure 20 like that shown in FIG. 2, using a conventional Internet browser software.

In this figure, the procedure 20 comprises a first step to access the welcome page of the Web service offered by the server 3, from the terminal and the browser software, for example this welcome page comprising a hypertext link to a search engine that the user can activate (step 21). When this link is activated, a procedure 20' is triggered on the server 3 during which the server sends a form for input of search criteria (step 21') to the user's terminal (step 21'). The user terminal receives and displays this form in step 22, and the user then fills it and the terminal sends it to the server 3 (step 23). The server receives the form filled in step 22' in which it retrieves search criteria formulated by the user, and starts the search in the database 4 (step 23'). In the next step 24', the server sends responses supplied by the database 4 to the user's terminal. The terminal displays these responses in step 24 of the procedure 20, in the form of a list of file identifiers, in which the user can select one or several files (step 25) in order to download them to the memory of its terminal.

Each file identifier in the responses list is associated with an immediate download request. Consequently, file identifiers are associated for example with links, for example hypertext links, that the user can activate to trigger direct downloading of the selected file stored in the memory of another terminal 14 of the network 5, to his terminal.

Figure 3:
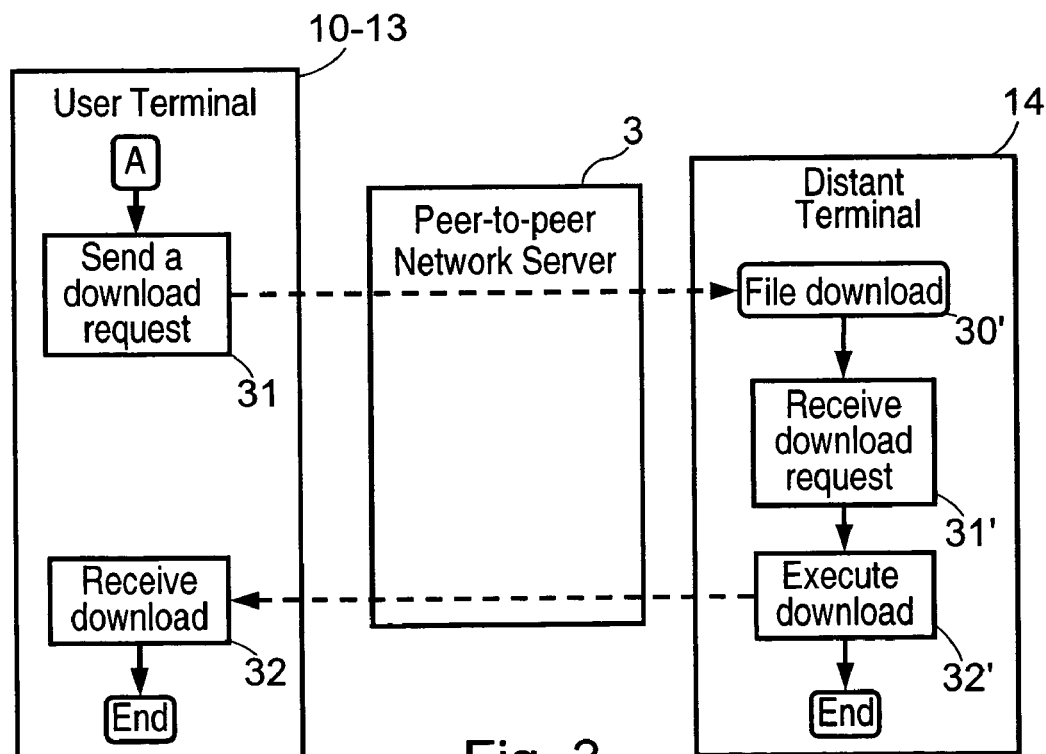
FIGS. 2 and 3 illustrate different steps in the method according to the invention, in the form of flowcharts.

Activating a link in the list of files displayed on the screen of the user's terminal 10-13 triggers emission of a download request by the terminal (step 31 in FIG. 3) to the terminal 14 connected to the peer-to-peer network 5, in which the selected file is located. Reception of this type of request by the terminal 14 triggers execution of a procedure 30' including a step 31' in which the download request is received, followed by a step 32' for actual downloading. Execution of step 32' triggers a downloading procedure 32 onto the user terminal 10-13 from which the request was sent.

According to the invention, each file identifier in the list of responses is also advantageously associated with a delayed download command. This system is designed to enable a user to order download of a file at a given moment, and to do the downloading itself later, possibly towards another terminal 10-13 than the terminal that sent the delayed download request.

On reception of such a delayed download request sent by a user terminal 10-13 (step 41 in FIG. 4), the server 3 executes a delayed download procedure 40' comprising a request reception step 41', followed by a step 2 sending a download request 42' to the terminal 14 on which the file to be downloaded is located. When the terminal 14 receives such a request, execution of the downloading procedure 30' described above is triggered, with the downloading destination being the server 3 rather than a user terminal, and the server receives the downloaded file and stores it temporarily in a memory (cache) 6 during the next step 43'.

In order to be able to receive the file downloaded by the server 3, the user needs to have identified himself with the server, for example by supplying an identifier together with a password that he can use to obtain the downloaded file.

As a variant, the server 3 may provide the user with a URL address in response to his delayed download request (step 41'), defining the temporary storage area of the downloaded file where he can find the file later so that he can download it to his terminal, this address being received by the user terminal in step 42.

Figure 4:
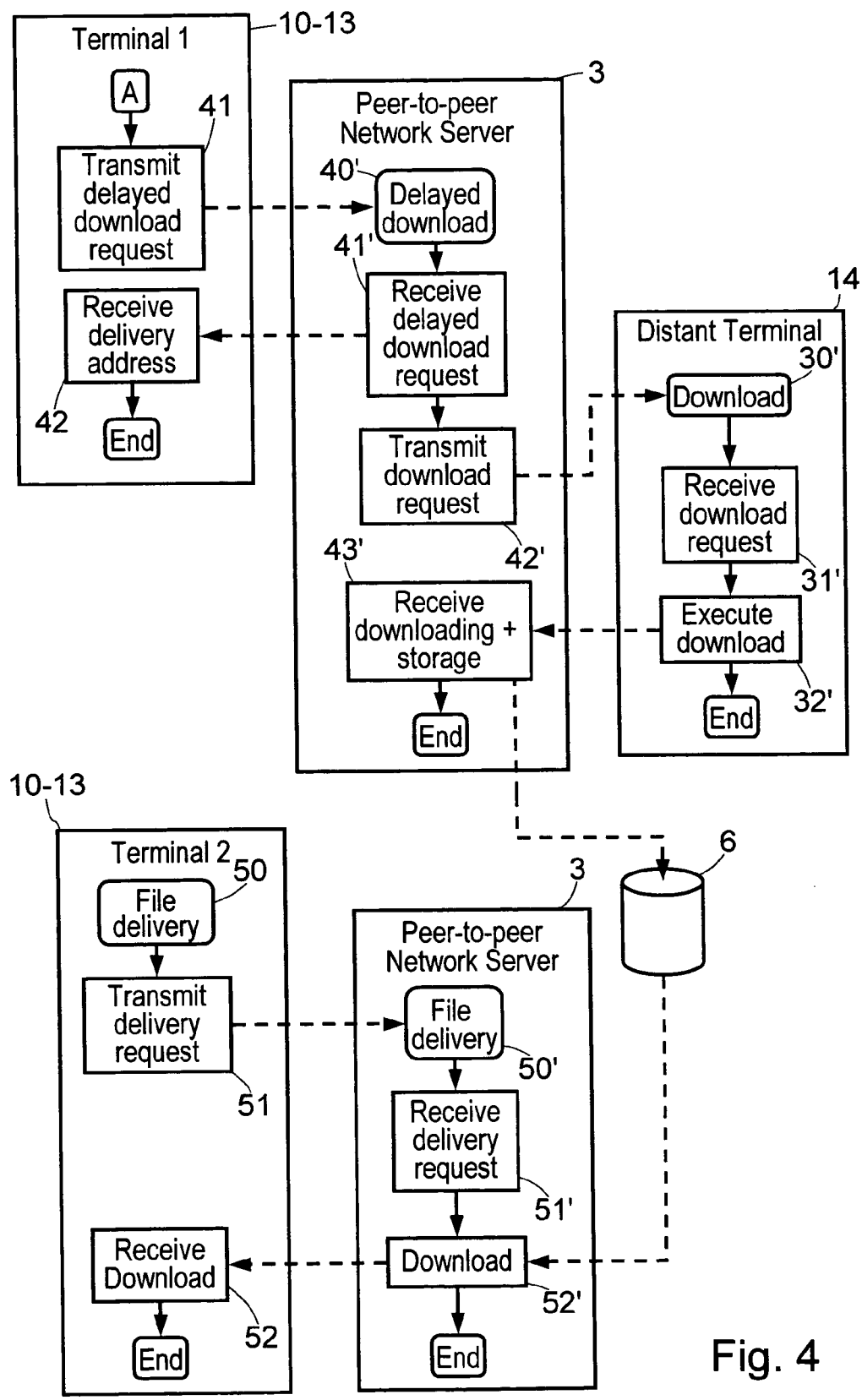
FIG. 4 shows a variant of the method according to the invention illustrated in FIG. 3.

When the user would like to receive the file for which he ordered downloading on server 3, he executes the procedure 50 illustrated in FIG. 4 in which, using his Internet browser software, he sent a delivery request to the server 3, in step 51. Reception of this request triggers execution of a procedure 50' by the server, in which the server receives the request (step 51') containing the identifier of the file to be downloaded and triggers downloading of the file (step 52') to the user terminal 10, the downloaded file being received by the user terminal in step 52.

Thus, the user can order downloading of a file, for example from a terminal without sufficient memory capacity to receive the file, such as a mobile terminal, and can order delivery of the file later, for example from a personal microcomputer 10.

This type of delayed download is also advantageous when the user's request is placed in a long queue because other users have requested the same file stored on the same terminal.

Note that only a user with a terminal 14 in the peer-to-peer network can request a delayed download.

Obviously, the downloading operations described above may depend on payment to be made by the user who requested downloading, if the requested file contains paying information. Some files proposed for downloading in the network 5 may contain musical or audiovisual tracks, or software. The content of the file may also be protected by a DRM (Digital Rights Management). In this case, the server 3 is also designed to manage payments and may be viewed from the remote terminal supplying the file to be downloaded to check that the user who requested downloading has actually paid for this downloading.

In the case of a delayed download, a temporary payment is made at the time that the file is downloaded by the server 3, this payment being confirmed at the time that the file is delivered to the user.

The file delivery mode may be adapted to the channel and the delivery terminal and to the choice made by the user (paid amount). Thus, the user can order a file so that he can read it all at once. In this case, the server 3 previously translates and/or transmits the file to the user so that it can only be read once, for example for reading in transit (streaming), in other words the file is read while it is downloaded without the entire file being stored in the terminal memory.

What is claimed is:

1. A method for accessing a peer-to-peer network connecting user terminals connected to a data transmission network, each user terminal being configured both as client and server to share information with other user terminals in the peer-to-peer network, the peer-to-peer network comprising a server connected to the data transmission network and managing a database memorizing information about user terminals in the peer-to-peer network and information shared by said user terminals, said method comprising:
    a search phase for finding shared information, said search phase being triggered on the server following a request sent by a user terminal connected to the server without executing an access software specific to the peer-to-peer network, this phase comprising a step of searching in the database for shared information corresponding to the request, a step in which a list of shared information is transmitted from the server to the terminal in response to the request, and a step in which shared information is selected on the user terminal so as to be downloaded, and
    a phase in which the shared information is downloaded to the terminal after a request for downloading the selected information has been sent from the user terminal not executing an access software specific to the peer-to-peer network.

2. The method according to claim 1, wherein the shared information is downloaded directly from the user terminal connected to the peer-to-peer network and in which shared information to be downloaded is located, to the user terminal not connected to the peer-to-peer network.

3. The method according to claim 1, wherein shared information is downloaded following a delayed download request, initially from the terminal connected to the peer-to-peer network and in which shared information to be downloaded is located, to the server, and secondly after a delay, from the server to the user terminal not connected to the peer-to-peer network, or another terminal available to the user.

4. The method according to claim 1, further comprising prior to downloading the selected shared information, a step of payment for the shared information by the user who made the download request, and a step in which payment is confirmed at the time that the shared information is downloaded.

5. A peer-to-peer network access system connecting user terminals connected to a data transmission network, each terminal being configured both as client and server to share information with other terminals in the peer-to-peer network, the peer-to-peer network comprising a server connected to the data transmission network and managing a database memorizing information about user terminals in the peer-to-peer network and information shared by said user terminals, said server comprising:
    means for receiving requests to search for shared information from user terminals connected to the server but not to the peer-to-peer network without executing a specific access software,
    means for processing said requests to search,
    means for supplying in response lists of shared information, and
    the system comprising means for downloading shared information from a user terminal connected to the peer-to-peer network to a user terminal connected to the server but not to the peer-to-peer network, and not executing an access software specific to the peer-to-peer network.

6. The system according to claim 5, further comprising means for downloading information shared directly from the terminal connected to the peer-to-peer network and in which this information is stored, to the user terminal connected to the data transmission network but not to the peer-to-peer network.

7. The system according to claim 5, wherein the server comprises storage means for temporarily storing shared information downloaded from a user terminal connected to the peer-to-peer network following a delayed download request sent by another user terminal.

8. The system according to claim 5, wherein the user terminals that might receive shared information in the peer-to-peer network comprise mobile terminals connected to a mobile telephone network, the server comprising means for being connected to the mobile telephone network and means for receiving requests for searches and for downloading information shared in the peer-to-peer network, from mobile terminals.

9. The system according to claim 5, wherein the data transmission network is the Internet network.

* * * * *